US009087099B2

(12) United States Patent
Camacho et al.

(10) Patent No.: US 9,087,099 B2
(45) Date of Patent: Jul. 21, 2015

(54) CENTRALLY MANAGED DRIVER AND VEHICLE RATINGS SYSTEM UPDATED VIA OVER-THE-AIR COMMUNICATIONS WITH TELEMATICS UNITS

(71) Applicant: General Motors LLC, Detroit, MI (US)

(72) Inventors: Esteban Camacho, Belleville, MI (US); Dexter Lowe, Sterling Heights, MI (US); Shpetim Veliu, Livonia, MI (US); David Lohmeier, Clarkston, MI (US); Scott Otterson, Clinton Township, MI (US); Jeffrey Olsen, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 253 days.

(21) Appl. No.: 13/904,480

(22) Filed: May 29, 2013

(65) Prior Publication Data

US 2014/0358896 A1    Dec. 4, 2014

(51) Int. Cl.
G06F 7/00      (2006.01)
G06F 17/30     (2006.01)
G06F 17/50     (2006.01)

(52) U.S. Cl.
CPC ...... *G06F 17/30424* (2013.01); *G06F 17/5095* (2013.01)

(58) Field of Classification Search
CPC .................................................. G06F 17/5095
See application file for complete search history.

(56) References Cited

U.S. PATENT DOCUMENTS

| | | | |
|---|---|---|---|
| 5,797,134 A | 8/1998 | McMillan et al. | |
| 6,064,970 A | 5/2000 | McMillan et al. | |
| 2013/0018677 A1* | 1/2013 | Chevrette | 705/4 |

* cited by examiner

Primary Examiner — Ajith Jacob
(74) Attorney, Agent, or Firm — Leydig, Voit & Mayer, Ltd.

(57) ABSTRACT

A system and method are described herein for acquiring and maintaining, in a centralized repository, driver and vehicle information for the purpose of rendering a rating for individual drivers and vehicles in accordance with established criteria and standards. A driver rating indicates the relative desirability of the particular driver given the expected wear and tear upon a vehicle arising from driver's use of the vehicle. A vehicle rating indicates the relative desirability of the particular vehicle given the use and maintenance history. Additional information is also maintained in the centralized repository that could be used to indicate an event for which a surcharge or discount is applicable. Thereafter, specified filtering criteria are applied bi-laterally to determine a set of rated vehicles that can be used by a particular rated driver.

20 Claims, 3 Drawing Sheets

| Parameter/Event 200 | Time of Acquisition 210 | Rated Entity 220 |
|---|---|---|
| Tire Pressure | First Ignition On of Rental/Use Period | Vehicle/Driver |
| Oil Level | First Ignition On of Rental/Use Period | Vehicle/Driver |
| Oil Life | First Ignition On of Rental/Use Period | Vehicle/Driver |
| Windshield Washer Fluid Level | First Ignition On of Rental/Use Period | Vehicle/Driver |
| DTC | First Ignition On of Rental/Use Period | Vehicle/Driver |
| Brake Fluid | First Ignition On of Rental/Use Period | Vehicle/Driver |
| Coolant Level | First Ignition On of Rental/Use Period | Vehicle/Driver |
| Battery Voltage | First Ignition On of Rental/Use Period | Vehicle/Driver |
| Fuel Level Start of Use | First Ignition On of Rental/Use Period | Vehicle/Driver |
| Fuel Level End of Use | Last Ignition Off of Rental/Use Period | Driver |
| Total Rental/Use Duration | Last Ignition Off of Rental/Use Period | Vehicle |
| Worn Brakes Alert | Last Ignition Off of Rental/Use Period | Vehicle |
| Low Oil Pressure Warning | At Time of Occurance | Vehicle |
| High Engine Temperature Warning | At Time of Occurance | Vehicle |
| Speed Threshold Exceeded | At Time of Occurance | Vehicle/Driver |
| Excessive Engine Speed (RPM Redline) | At Time of Occurance | Driver |
| Fuel Flow | At Time of Occurance | Vehicle |
| Brakes Overheating | At Time of Occurance | Vehicle |
| Rental Times | Last Ignition Off of Rental/Use Period | Driver |
| HFC Minute Usage | Last Ignition Off of Rental/Use Period | Driver |
| Traction Control Engaged | At Time of Occurance | Driver |
| No Turn Signal at Turn/Lane Change | At Time of Occurance | Driver |
| Turn Signal Alert | At Time of Occurance | Driver |
| GeoBox Data – Vehicle Usage Outside Approved Area | At Time of Occurance | Driver |
| Hard Cornering | At Time of Occurance | Driver |
| Hard Braking | At Time of Occurance | Driver |
| Hard Acceleration | At Time of Occurance | Driver |
| Prolonged Simultaneous Brake and Accelerator | At Time of Occurance | Driver |
| Vehicle Left Unlocked Without Occupant | At Time of Occurance | Driver |
| Collision | At Time of Occurance | Driver |
| Emergency Call | At Time of Occurance | Driver |

FIG. 2

CENTRALLY MANAGED DRIVER AND VEHICLE RATINGS SYSTEM UPDATED VIA OVER-THE-AIR COMMUNICATIONS WITH TELEMATICS UNITS

FIELD

The present disclosure relates generally to telematics systems and more particularly to systems and associated telematics services provided by a communications center communicatively coupled to installed telematics units via mobile wireless network connections. More particularly, the present disclosure is directed to a centrally managed ratings system for both multi-user shared/rental vehicles and users of such vehicles.

BACKGROUND

Telematics units within mobile vehicles provide subscribers with connectivity to a telematics service provider (TSP). The TSP provides subscribers with an array of services ranging from emergency call handling and stolen vehicle recovery to vehicle system status and diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide subscribers/users with a variety of telematics-facilitated services such as those described herein.

Novel methods of vehicle time sharing have developed in recent years in response to increased opportunities for monetizing the idle capacity of unused vehicles. Automobile rental services have become increasingly popular in locations where the costs of owning and storing a vehicle are high relative to potential owners' available cash flows and where potential owners are likely to use vehicles for only a small percentage of the total available time. Vehicle time sharing business models have become particularly successful in urban areas and nearby large universities. Meanwhile, more traditional automobile rental business models, such as those that maintain large vehicle fleets in the vicinity of airports to cater to business travelers and vacationers, have remained successful.

Automobile rental services and other automobile owners who intend to rent, loan or share their automobiles with other drivers may maintain accounts linking the telematics units with TSPs to preserve the functionality of telematics units for their customers and/or share groups. In the context of automobile rentals and rideshare groups, an element of mutual trust/confidence is needed with regard to both owners and drivers. From an automobile owner perspective, there is a desire to ensure that renters and/or rideshare users do not abuse, misuse or otherwise subject a vehicle to harmful uses and/or actual damage. If a particular user has driving style that is more likely to lead to vehicle damage or unusual wear/tear—even if considered safe, it is in the vehicle owner/shareholder's best interest to deny such user access to the vehicle or at least require use at a higher cost. From a user perspective, there is a desire to ensure that the vehicle that they use has been properly used/maintained and is in good working order. A perspective user could decline rental or partial ownership/liability for a poorly maintained or damaged rental/shared vehicle. Furthermore, users could benefit from receiving objective feedback regarding their driving habits measured against standards established from observing the driving behavior of thousands of other drivers. The same can be said for vehicle owners with regard to the quality of maintenance and proper use of particular vehicles.

Known systems acquire and process a variety of vehicle sensor and GPS information to render secondary information. However, such systems, including for example the one described in McMillan et al., U.S. Pat. No. 6,064,970, focus upon identifying/analyzing/characterizing driver behavior for the purpose of providing a driver/vehicle safety analysis and rating—and ultimately provide an insurance discount and/or surcharge in view of observed actions during a prior billing period. In other words, the driver's actions are monitored during an insurance billing period. The actions are analyzed to render a penalty/reward at the end of the insurance billing period. Such characteristics include how, when, where a user operates a vehicle. The resulting processing of such information establishes a driver rating based upon the likelihood that the driver will be involved in an incident for which an insurance claim will arise.

The above body of information is provided for the convenience of the reader. The foregoing describes a suitable environment for which the described system and method are provided, and is not an attempt to review or catalog the prior art.

BRIEF SUMMARY

A system and method are described herein for acquiring and maintaining, in a centralized repository, driver and vehicle information for the purpose of rendering a rating for individual drivers and vehicles in accordance with established criteria and standards. A driver rating indicates the relative desirability of the particular driver given the expected wear and tear upon a vehicle arising from driver's use of the vehicle. A vehicle rating indicates the relative desirability of the particular vehicle given the use and maintenance history. Additional information is also maintained in the centralized repository that could be used to indicate an event for which a surcharge or discount is applicable.

In accordance with the disclosure, a method and ratings computer system are described for providing ratings for uniquely identified users and vehicle entities within a multi-user vehicle use environment wherein vehicles are equipped with telematics units configured to acquire and provide vehicle usage parameter values for storage within a multi-user vehicle database and query engine. The method includes storing, within the multi-user vehicle database and query engine for a multiplicity of uniquely identified users and uniquely identified vehicles, the vehicle usage parameter values during operation of the uniquely identified vehicles by the uniquely identified users. The method further comprises applying ratings criteria to the vehicle usage parameter values associated with uniquely identified vehicles and uniquely identified users, stored in the multi-user vehicle database to render ratings for the uniquely identified vehicles and uniquely identified users.

A vehicle request is received. The vehicle request includes a unique identifier for a rated user corresponding to one of the uniquely identified users. The vehicle request also includes a vehicle rating level. The method further includes applying, for responsive rated vehicles in the multi-user vehicle database meeting the vehicle rating level, a driver rating level specified by the responsive rated vehicles thereby rendering a rated vehicle list meeting bi-directional filters specified by the responsive rated vehicles and the rated user. Thereafter, the rated vehicle list is provided for selection and then use by the rated user a rated vehicle from the rated vehicle list.

The centralized repository of driver and vehicle information, including both ratings and the underlying information upon which the ratings are based, potentially provides a high degree of confidence and assurance between drivers and providers of vehicles used/rented by the drivers—something that cannot be rendered by known systems that rate the drivers for purposes of establishing insurance rates.

In a further implementation, the present invention is implemented as computer-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 2 is an exemplary set of parameters for which values are acquired and provided by the telematics units during operation of a rental/shared vehicle for storage in tables maintained by a database containing driver and vehicle ratings related data for purposes of generating driver and vehicle ratings in a rental/shared vehicle environment;

DETAILED DESCRIPTION

Before discussing the details of the invention and the environment wherein the invention may be used, a brief overview is given to guide the reader. In general terms, not intended to limit the claims, a system and method are described herein for maintaining a database and ratings system for multi-user (e.g., rental, shared, etc.) vehicles and drivers. The vehicles transmit a variety of sensor-based measurements over-the-air for storage in a multi-user vehicle use database via mobile wireless communications devices integrated with/within telematics units installed on the vehicles.

A ratings engine associated with the multi-user vehicle use database, accessed by users for example via the Internet, enables drivers (e.g., renters) and owners (e.g., rental companies) to query the rideshare database to render a variety of ratings information for particular drivers and/or vehicles for which information was previously stored/tabled in the rideshare database.

In the present system and method, criteria applied to information maintained by the multi-user vehicle use database—information previously provided by telematics units relating to drivers and vehicles—to render a rating, fundamentally differs from criteria applied by insurers to assess a claim risk for a potential or current insured. The system and method described herein facilitate rating: (1) a current operational health of an identified vehicle, and (2) a foreseeable impact that use of vehicles by a particular user will have upon the operational health of the vehicles.

Renters/users of a rental/shared vehicle seek assurance that the vehicle will operate properly during use. Renters/sharers of a rental/shared vehicle seek assurance that the vehicle will be used/maintained in a manner that ensures good long-term health of the vehicle. Both of these aims can be met by the described system and method using criteria that do not necessitate determining the likelihood that the vehicle will be involved in an event for which an insurance claim will arise and the magnitude of such claim. In this way, the described system and method fundamentally differ from the prior systems that apply criteria to measurements and events acquired during vehicle operation to rate, reward and/or penalize users based upon recorded instances of safe/unsafe driving behavior that impact a likelihood that a particular driver's driving behavior will lead to an insurance claim.

It will be appreciated that while the principles described herein are most widely applicable to telematics units incorporated into over-the-road vehicles, the teachings are also potentially applicable to other shared vehicles such as heavy machinery equipped with telematics units. In heavy machinery, various operational parameter values (e.g., maximum payload weight, duration of operation under high power/torque demand conditions) can be acquired and stored to identify potentially destructive abusive operation of rented heavy machinery by a lessee.

Figure 1:
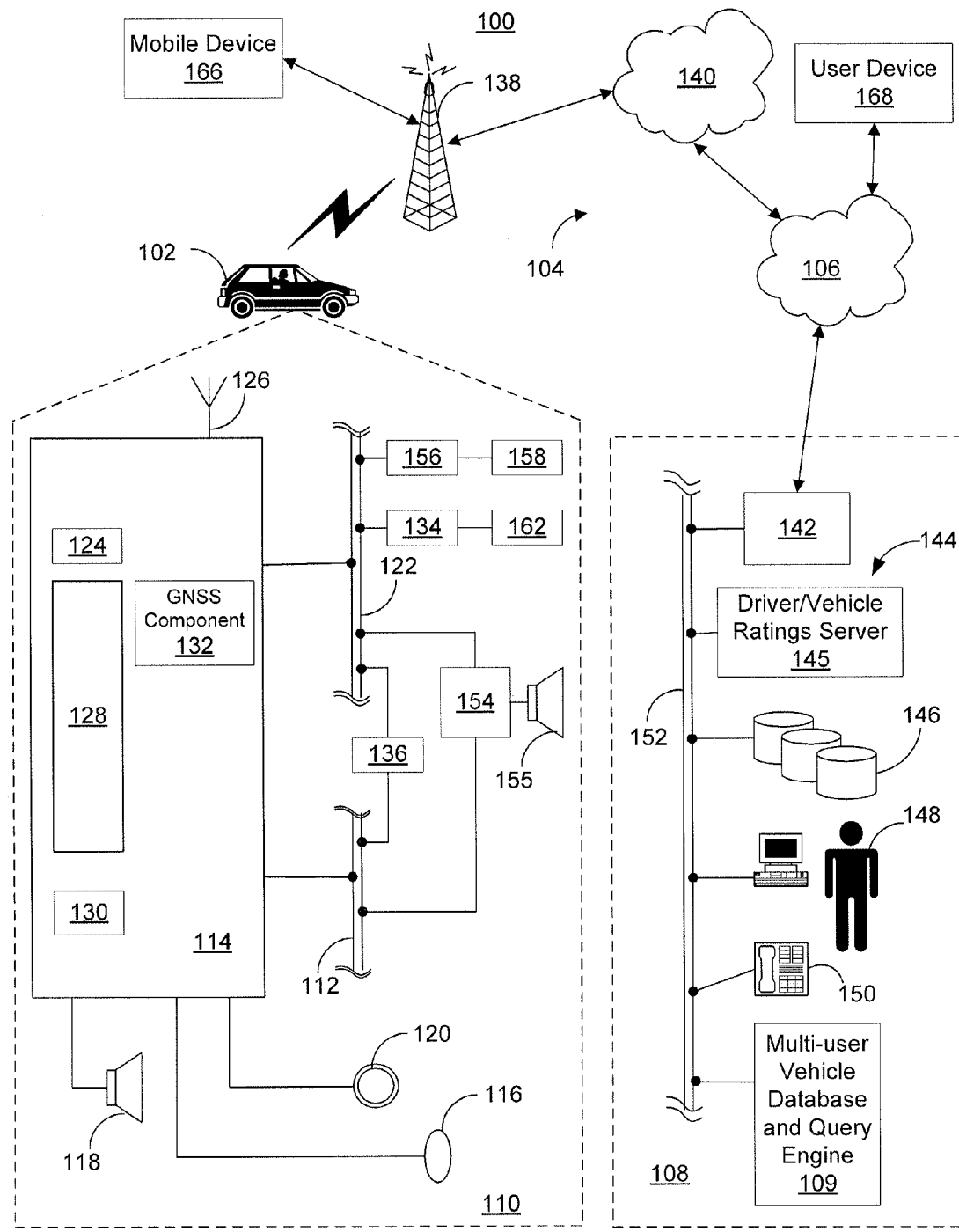
FIG. 1 is a schematic diagram of an operating environment for a mobile vehicle communication system usable in implementations of the described principles.

An exemplary computing and network communications environment is described hereinafter. It will be appreciated that the described environment is an illustrative example, and does not imply any limitation regarding the use of other environments to practice the invention. With reference to FIG. 1 there is shown an example of a communication system 100 that may be used with the present method and system to pass vehicle and driver information. The communication system 100 generally includes a vehicle 102, a mobile wireless network system 104, a land network 106 and a communications center 108. It should be appreciated that the overall architecture, setup and operation, as well as the individual components of the communication system 100 is generally known in the art.

In accordance with an illustrative example, the communication center 108 includes a multi-user vehicle database and query engine (database and query engine) 109. The database and query engine 109, incorporating functional components facilitating updates to vehicle and/or user tables maintained on the database and query engine 109 that contains both vehicle and user information relating to operation of identified vehicles by identified drivers. The database and query engine 109 maintains a multitude of both current status information as well as historical information (both driver and vehicle) upon which rating criteria are applied to render vehicle and driver ratings. Such ratings include individual characteristic ratings as well as one or more composite ratings for drivers/vehicles. Composite ratings, based upon fewer than all driver/vehicle characteristics, are combined according to weightings specified in overall rating criteria for drivers and vehicles to render an overall rating for each. As such, a variety of rating criteria are applied to vehicle and user information retrieved from the multi-user vehicle database and query engine 109 to render a variety of individualized ratings for users and vehicles in a multi-user vehicle user environment.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, a telematics unit 114, a microphone 116, a speaker 118 and buttons and/or controls 120 integrated with the telematics unit 114. In an instructional mode of operation of the telematics unit 114, the speaker 118 is used to issue an audible notification to a user when a bad driving event has been sensed that is passed via message within the communication system 100 from the vehicle 102 to the communications center 108.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle. The telematics unit 114 also supports receiving and forwarding to a multi-user vehicle database and query engine 109, via the mobile wireless component 124, a variety of sensor readings relating to operation of the vehicle 102.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

The telematics unit 114 uses radio transmissions to establish communications channels with the mobile wireless network system 104 so that voice and/or data signals, including ones containing data corresponding to one or more events used to calculate a vehicle and/or driver rating, can be sent and received via the communications channels. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with an interface for inputting verbal or other auditory commands to the telematics unit 114, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control. Data from the sensor interface modules 134 is provided to automobile electronic control units, including an engine control unit (ECU), not shown in FIG. 1. Furthermore, in accordance with an illustrative example, the data provided by the sensor interface modules 134 is provided (either directly via the vehicle bus 122 or indirectly via the ECU) to the telematics unit 114. By way of example, the telematics unit 114, selectively processes and forwards signal values acquired via the sensors 162, in accordance with a configured signal data acquisition/filtering scheme. The forwarded signal values are received by, for example, a driver and vehicle ratings server (ratings server) 145. The ratings server 145 thereafter submits the received signal values via database request messages to the multi-user vehicle database and query engine 109. Examples of the types of information passed to the multi-user vehicle database and query engine 109 are described herein below with reference to FIG. 2.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144 (including the ratings server 145), databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The servers 144, as noted above, include the ratings server 145. By way of example, the ratings server 145 is configured with an Internet interface facilitating providing ratings services to a variety of user/subscribers specifying ratings thresholds for minimally qualified drivers and/or vehicles and retrieving responsive driver and/or vehicle ratings information for drivers and/or vehicles meeting the ratings thresholds. In a typical scenario, vehicle owners specify minimal ratings requirements for potential users of their vehicles. Thereafter, rated users logon to the ratings server 145 and specify minimal ratings requirements for potential vehicles. In response to the ratings server 145 queries the multi-user vehicle database and query engine 109 to determine the intersection of a set of vehicles meeting the rated user-specified minimum vehicle rating AND the set of vehicles for which the rated user meets vehicle owner-specified minimum driver rating. The resulting set of vehicles are returned to the ratings server 145 for presentation to the requesting rated user. Thus, the ratings server 145 simultaneously applied bi-directional exclusion preferences/rules specified by rated users for rated vehicles. The automated nature of the filtering procedure when a rated user specifies minimum vehicle ratings is dependent upon the ability of both users and vehicles to both: (1) be rated and (2) specify a threshold rate for candidate vehicles/users.

To that end, the ratings server 145 is also configured with a database query interface facilitating submitting structured queries to the multi-user vehicle database and query engine 109 and receiving/processing subsequent responsive vehicle/driver data. In general, the ratings server 145 responds to ratings requests from users, acquires relevant data from the tables maintained by the multi-user vehicle database and query engine 109, applies specified ratings criteria to the acquired data, and renders responsive ratings to the requesting users. The functionality of the ratings server 145, including exemplary ratings algorithms, are described, by way of example herein below, with reference to FIG. 4.

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

FIG. 2 provides an exemplary set of measurements acquired, processed and forwarded by the telematics unit 114 (either directly or via the ratings server 145) to the multi-user vehicle database and query engine 109. A column 200 identifies a measurement type. A column 210 identifies a description of when an event is generated to cause the acquisition of a value for the particular measurement type by the telematics unit 114 which thereafter forwards a measured value/event of the identified type for storage in the database and query engine 109. A column 220 identifies an entity type (vehicle, driver, or both) to which the measurement pertains.

As shown in the illustrative example, multi-user vehicle parameter values that are acquired and forwarded by the telematics unit 114 when a user initially turns on the vehicle 102 a first time during a period of use include: tire pressure, oil level, oil life, windshield washer fluid level, diagnostic trouble codes (DTC—a list indicating each trouble code that has been set during the current use of the vehicle), brake fluid, coolant level, battery voltage, and fuel level. Each of these, in some cases critical, readings is pertinent to vehicle operation, safety and maintenance. Moreover, storing a second value from the sensors responsible for providing each of these parameters at the end of a vehicle use facilitates establishing additional driver rating parameter information. In particular, information indicative of the driver's treatment and care for a temporarily used vehicle can be obtained by comparing the stored end of use value to the beginning of use value for each parameter. The comparison values can be used to establish further driver rating data used to render an overall composite driver rating.

In a particular example, a fuel level at the beginning of a use period, by itself, contributes to the vehicle's rating. A fuel level value while the vehicle is awaiting a next use contributes to a particular vehicle's readiness rating. A very low fuel level would result in a lowered rating for the vehicle to reflect the general desirability of a reasonably full tank at the beginning of a use. The fuel level at the end of a use is compared to a fuel level at the beginning of a use to rate a driver's tendency to re-fill prior to the dropping off a vehicle. A driver that tends to leave less gas in the tank at an end of use than at the beginning is generally a less desirable, and thus lower rated, user.

Additional rating parameters, taken at the end of a use period to contribute to an overall vehicle rating include: total duration of use (actual drive time) and worn brakes alert.

During operation, any warning sensor relating to the operational status of the vehicle 102 may be used to render an overall rating for a vehicle with regard to the state of maintenance or as an indication of latent damage that would render a lower vehicle rating. Such sensor readings include: low oil pressure, high engine temperature, fuel flow disruption, overheating brakes, vehicle speed threshold exceeded, engine speed threshold (redline) exceeded, etc.). These warnings are critical and thus are immediately processed and forwarded by the telematics unit 114 to the ratings server 145. When these warnings are registered, a warning message may separately be issued by the ratings server 145 or other service associated with the communications center 108 to minimize damage to the vehicle. Some of the above instantaneous warnings that contribute to vehicle ratings, such as the vehicle/engine speed threshold exceeded warning, may also contribute to driver ratings.

Turning to parameters that may be used to rate a driver/user of a vehicle, a number of parameters are acquired at the end of a user period that contribute to a driver rating. Such parameters include: total time of use period, number of rentals/uses, and hands-free calling minutes used (HFC). Such multi-user vehicle parameter values are acquired and forwarded by the telematics unit 114 when a user turns off the ignition (if at the end of a rental/shared use period) and forwarded to the ratings server 145 for processing and updating a driver's history maintained in the multi-user vehicle database and query engine 109.

With continued reference to FIG. 2, driver rating related events/measurements that are forwarded by the telematics unit 114 during assignment of the vehicle to a particular driver include the following: vehicle speed threshold exceeded, traction control engaged, no turn signal during turn/lane change, turn signal left on after lane change completed, hard cornering, hard braking, hard acceleration, prolonged simultaneous activation of brake and accelerator, excessive engine speed, vehicle collision, and vehicle left unlocked after driver exits vehicle. Moreover, an emergency call during a use period may be used for rating a driver by covering all instances where emergency service is needed instead of just collisions. Additionally, in cases where use is geographically limited, traveling outside a specified geographic region registers a violation of such use limitation. It is noted that the above identification of potential data acquired and forwarded by the telematics unit 114 to the ratings server 145 for processing and storage in the multi-user vehicle database and query engine 109 is exemplary in nature. The intention is to demonstrate the capability of the telematics unit to acquire a vast variety of information that is potentially used to establish ratings for drivers/users and multi-user vehicles.

Figure 3:
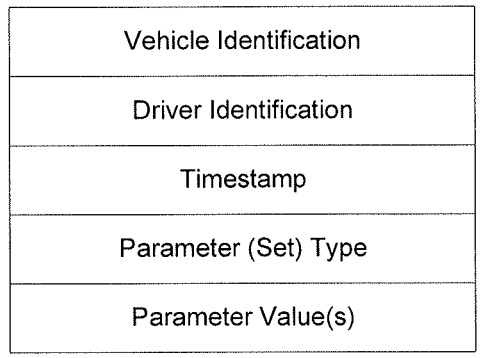
FIG. 3 is an exemplary set of data fields in a message provided by the telematics unit containing vehicle usage information for storage in the database.

FIG. 3 provides an exemplary message data format for messages passed by the telematics unit 114 to the multi-user vehicle database and query engine 109. By way of example, the exemplary message format includes the following data payload: vehicle ID, driver ID, time stamp, parameter type, and parameter value(s). The set of parameters included for a single incident (e.g., a collision instance) can be substantial and include a variety of relevant information including: vehicle speed at time of contact, location of contact on vehicle, braking status, accelerator status, etc. It is noted that such messages can be combined/packed into a single message transmission, from the telematics unit 114 to the multi-user vehicle database and query engine 109, comprising multiple individual messages. The multi-user vehicle database and query engine 109 unpacks and tables the multiple received individual messages within contained within the single message transmission.

The ratings server 145, by way of example, processes the raw data provided by telematics units, such as the telematics unit 114, relating to both drivers/users and multi-user vehicles registered in the system. A vast variety of criteria are potentially applied to render both specific ratings for a category (e.g., maintenance, hard driving, etc.) as well as an overall rating. By supporting categories for ratings, potentially complex rating requests are supported wherein multiple ratings are specified (by either vehicle owners or driver/users) for particular categories to reflect importance preferences of individual participants in the system. For example, a car owner may not be as concerned whether a particular person always re-fills the tank as long as the driver is considered a gentle driver. The various levels for rating components are established according to standards/ratings rules. In some cases, a rating begins at a highest level initially and is lowered in response to negative events (e.g., a driver exceeds the speed threshold set for a vehicle). Moreover, a time-weighted aspect to ratings may also be used to reduce the relevance of events (both good and bad) that may have previously carried a heavy weighting at the time of occurrence. Thus, good as well as bad events become less important to a current rating of a vehicle or driver/user over time (or multiple subsequent uses). As can be seen from the above discussion, there are many potential ways to assign a rating (or multiple category-based rating) to vehicles and user/drivers.

Figure 4:
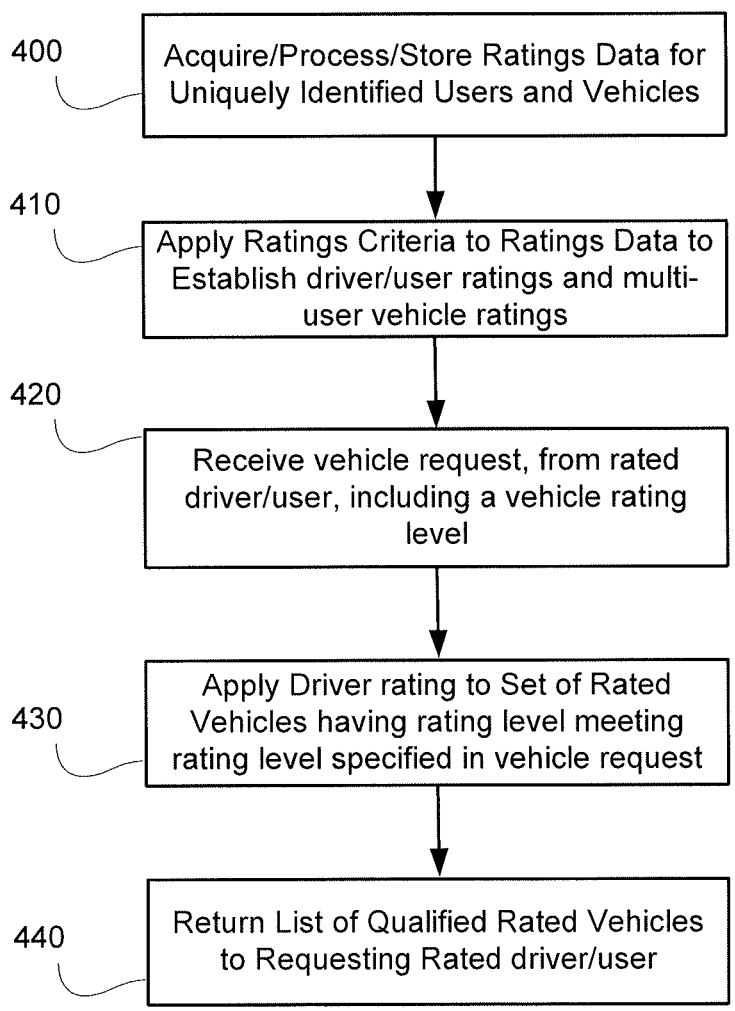
FIG. 4 is a flowchart illustrating a process implemented on ratings server to render a list of rated vehicles in response to a request from a rated user specifying a vehicle rating level.

Turning to FIG. 4, a flowchart summarizes a set of operations performed, in potentially any order and multiple times, by the ratings server 145 to maintain the multi-user vehicle database and query engine 109 and respond to user requests for ratings relating to specified entities, such as an identified driver or vehicle. Such requests are received, for example, by the ratings server 145 via an Internet page accessed by drivers/users through browser applications running on computing devices such as the mobile devices 166 and user device 168. During step 400 vehicle and user data of the types enumerated in FIG. 2 is acquired by telematics units, such as the telematics unit 114, incorporated into vehicles. Such vehicle and user information is transferred from vehicles, via the telematics units and the ratings server 145, to the multi-user vehicle database and query engine 109. In an exemplary embodiment, the ratings server 145 receives messages from the vehicle telematics units containing the data formatted, by way of example, in the manner depicted in FIG. 3. The ratings server 145 extracts the relevant vehicle and user information from the received messages and submits the extracted information to the multi-user vehicle database and query engine 109. The extracted information is thus stored in the multi-user vehicle database and query engine 109. The resulting sets of stored vehicle and user data are associated with particular vehicles and users identified by a system-wide unique identifier. In the case of a vehicle, a vehicle identification number (VIN) provides a unique identification for associating vehicle related information for purposes of rating the vehicle. In the case of a user, a social security number or driver's license number uniquely identifies driver related information for purposes of rating the driver.

During step 410, the ratings server 145 applies any of a multitude of configured ratings criteria specified for vehicles and users, to the stored information for vehicles and users stored in the multi-user vehicle database and query engine 109, to render ratings for a particular vehicle or user. Such ratings can result from any of a wide variety of rating criteria supported by the ratings server. Relatively static, pre-configured, ratings criteria are supported by the ratings server 145. On the other hand, the ratings server 145 supports a virtually limitless number of customized criteria. The customized criteria potentially specify particular subsets of the full set of vehicle and driver information types. The customized criteria also potentially specify for particular vehicle and user information types: weights applied to particular types of vehicle and user information, time windows, most recent instances (e.g., last 10 uses), age-based weight given to instances of a designated type (emphasize recent data over older data). Moreover, the ratings server supports a variety of normalized ratings output ranges and types such as: stars, letter grading, numerical (e.g., 0-10), etc. Such ratings can be distinguished based upon whether the rated entity is a user (e.g., a letter grade) and a vehicle (e.g. a star rating). Thus, a very diverse range of both static and highly customized ratings criteria, and a flexible interface for specifying customized ratings, are contemplated in accordance with the present disclosure.

During step 420, the ratings server 145 receives a vehicle request from a rated user via, for example, the mobile device 166 or the user device 168. The vehicle request specifies a vehicle rating level used by the rating server 145 to filter the set of potentially available vehicles for the rated user. The user is uniquely identified in the system for purposes of retrieving user rating information for purposes of assigning a rating to the requesting user. Thus two applicable ratings-based filters arise from each vehicle request from a rated user: (1) a vehicle filter that renders a list of potentially responsive vehicles; and (2) a user filter that disqualifies potentially responsive vehicles based upon user rating-based limitations specified for individual ones of the responsive vehicles.

During step 430, the ratings server 145 applies each of the two above-identified vehicle-based and user-based filters to retrieved vehicle and user information retrieved from the multi-user vehicle database and query engine 109 to render a resulting set of potential vehicles for the requesting user. Thus, the described system facilitates placing a barrier between vehicles and users that are deemed unfit for using particular ones of the otherwise desired/available vehicles.

During step 440, the ratings server 145 returns a listing of vehicles meeting the bi-lateral mutual filters specified by the rated user and individual ones of a set of responsive rated vehicles to the requesting rated user.

It will thus be appreciated that the described system and method allows for reliable over-the-air submission, via telematics units, of driver and vehicle information relevant to rating such entities and thereafter providing driver and vehicle ratings information by applying specified criteria to the provided driver and vehicle information maintained in a database. Such ratings are used to facilitate applying mutual user and vehicle ratings requirements in response to requests of rated users. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, executed by a ratings computer system, for providing ratings for uniquely identified users and vehicle entities within a multi-user vehicle use environment wherein vehicles are equipped with telematics units configured to acquire and provide vehicle usage parameter values for storage within a multi-user vehicle database and query engine, the method comprising the steps of:

storing, within the multi-user vehicle database and query engine for a multiplicity of uniquely identified users and uniquely identified vehicles, the vehicle usage parameter values during operation of the uniquely identified vehicles by the uniquely identified users;

applying ratings criteria to the vehicle usage parameter values associated with uniquely identified vehicles and uniquely identified users, stored in the multi-user vehicle database to render ratings for the uniquely identified vehicles and uniquely identified users;

receiving a vehicle request including:
        a unique identifier for a rated user corresponding to one of the uniquely identified users, and
        a vehicle rating level;

applying, for responsive rated vehicles in the multi-user vehicle database meeting the vehicle rating level, a driver rating level specified by the responsive rated vehicles thereby rendering a rated vehicle list meeting bi-directional filters specified by the responsive rated vehicles and the rated user; and providing the rated vehicle list for selection and then use by the rated user a rated vehicle from the rated vehicle list.

2. The method of claim 1 wherein the vehicle usage parameters are provided by the telematics units over-the-air to the multi-user vehicle database and query engine.

3. The method of claim 2 wherein a rating engine receives the vehicle usage parameters from the telematics units and formulates requests for storing the vehicle usage parameters in the multi-user vehicle database and query engine.

4. The method of claim 1 wherein the vehicle usage parameter values associated with uniquely identified vehicles include data types from vehicle sensors recorded at particular specified events during a period of use, the data types including: data types acquired during first turn-on of a vehicle and data types acquired at last turn-off of the vehicle.

5. The method of claim 4 wherein the vehicle usage parameter values associated with uniquely identified vehicles include data types from vehicle sensors recorded at each occurrence of a particular event type.

6. The method of claim 1 wherein the vehicle usage parameter values associated with uniquely identified users include data types from vehicle sensors recorded at each occurrence of a particular event type.

7. The method of claim 6 wherein the vehicle usage parameter values associated with uniquely identified users include change in status data types derived from a first value from a sensor acquired during first turn-on of a vehicle and a second value from the sensor acquired at last turn-off of the vehicle.

8. The method of claim 1 further comprising:
    providing, by a telematics unit, an audible warning when an event negatively impacting a user rating is sensed.

9. A non-transitory computer-readable medium including computer-executable instructions for providing ratings for uniquely identified users and vehicle entities within a multi-user vehicle use environment wherein vehicles are equipped with telematics units configured to acquire and provide vehicle usage parameter values for storage within a multi-user vehicle database and query engine, the computer-executable instructions facilitating carrying out the steps of:

storing, within the multi-user vehicle database and query engine for a multiplicity of uniquely identified users and uniquely identified vehicles, the vehicle usage parameter values during operation of the uniquely identified vehicles by the uniquely identified users;

applying ratings criteria to the vehicle usage parameter values associated with uniquely identified vehicles and uniquely identified users, stored in the multi-user vehicle database to render ratings for the uniquely identified vehicles and uniquely identified users;

receiving a vehicle request including:
        a unique identifier for a rated user corresponding to one of the uniquely identified users, and
        a vehicle rating level;

applying, for responsive rated vehicles in the multi-user vehicle database meeting the vehicle rating level, a driver rating level specified by the responsive rated vehicles thereby rendering a rated vehicle list meeting bi-directional filters specified by the responsive rated vehicles and the rated user; and providing the rated vehicle list for selection and then use by the rated user a rated vehicle from the rated vehicle list.

10. The non-transitory computer-readable medium of claim 9 wherein the vehicle usage parameters are provided by the telematics units over-the-air to the multi-user vehicle database and query engine.

11. The non-transitory computer-readable medium of claim 10 wherein a rating engine receives the vehicle usage parameters from the telematics units and formulates requests for storing the vehicle usage parameters in the multi-user vehicle database and query engine.

12. The non-transitory computer-readable medium of claim 9 wherein the vehicle usage parameter values associated with uniquely identified vehicles include data types from vehicle sensors recorded at particular specified events during a period of use, the data types including: data types acquired during first turn-on of a vehicle and data types acquired at last turn-off of the vehicle; and wherein the vehicle usage parameter values associated with uniquely identified vehicles include data types from vehicle sensors recorded at each occurrence of a particular event type.

13. The non-transitory computer-readable medium of claim 9 wherein the vehicle usage parameter values associated with uniquely identified users include data types from vehicle sensors recorded at each occurrence of a particular event type; and wherein the vehicle usage parameter values associated with uniquely identified users include change in status data types derived from a first value from a sensor acquired during first turn-on of a vehicle and a second value from the sensor acquired at last turn-off of the vehicle.

14. The non-transitory computer-readable medium of claim 9 further comprising computer-executable instructions for:

providing, by a telematics unit, an audible warning when an event negatively impacting a user rating is sensed.

15. A networked system for providing ratings for uniquely identified users and vehicle entities within a multi-user vehicle use environment, the system comprising vehicles equipped with telematics units configured to acquire and forward vehicle usage parameter values;

a multi-user vehicle database and query engine for storing the vehicle usage parameter values; and a ratings server, and a multi-user vehicle database and query engine;

wherein the networked system is configured with processors and non-transitory computer-readable media including computer-executable instructions for performing the steps of:
- storing, within the multi-user vehicle database and query engine for a multiplicity of uniquely identified users and uniquely identified vehicles, the vehicle usage parameter values during operation of the uniquely identified vehicles by the uniquely identified users;
- applying, by the ratings server, ratings criteria to the vehicle usage parameter values associated with uniquely identified vehicles and uniquely identified users, stored in the multi-user vehicle database to render ratings for the uniquely identified vehicles and uniquely identified users;
- receiving, by the ratings server, a vehicle request including:
  - a unique identifier for a rated user corresponding to one of the uniquely identified users, and
  - a vehicle rating level;
- applying, by the ratings server, for responsive rated vehicles in the multi-user vehicle database meeting the vehicle rating level, a driver rating level specified by the responsive rated vehicles thereby rendering a rated vehicle list meeting bi-directional filters specified by the responsive rated vehicles and the rated user; and
- providing the rated vehicle list for selection and then use by the rated user a rated vehicle from the rated vehicle list.

16. The system of claim 15 wherein the vehicle usage parameters are provided by the telematics units over-the-air to the multi-user vehicle database and query engine.

17. The system of claim 16 wherein a rating engine receives the vehicle usage parameters from the telematics units and formulates requests for storing the vehicle usage parameters in the multi-user vehicle database and query engine.

18. The system of claim 15 wherein the vehicle usage parameter values associated with uniquely identified vehicles include data types from vehicle sensors recorded at particular specified events during a period of use, the data types including: data types acquired during first turn-on of a vehicle and data types acquired at last turn-off of the vehicle; and wherein the vehicle usage parameter values associated with uniquely identified vehicles include data types from vehicle sensors recorded at each occurrence of a particular event type.

19. The system of claim 15 wherein the vehicle usage parameter values associated with uniquely identified users include data types from vehicle sensors recorded at each occurrence of a particular event type; and wherein the vehicle usage parameter values associated with uniquely identified users include change in status data types derived from a first value from a sensor acquired during first turn-on of a vehicle and a second value from the sensor acquired at last turn-off of the vehicle.

20. The system of claim 15 further comprising computer-executable instructions for:

providing, by a telematics unit, an audible warning when an event negatively impacting a user rating is sensed.

* * * * *